(12) United States Patent
Stretton

(10) Patent No.: US 6,434,927 B1
(45) Date of Patent: Aug. 20, 2002

(54) THRUST REVERSER

(75) Inventor: Richard G Stretton, Loughborough (GB)

(73) Assignee: Rolls Royce PLC (Derby), London (GB)

( * ) Notice: Subject to any disclaimer, the term of this patent is extended or adjusted under 35 U.S.C. 154(b) by 0 days.

(21) Appl. No.: 09/506,596

(22) Filed: Feb. 18, 2000

(30) Foreign Application Priority Data

Feb. 23, 1999 (GB) .............................................. 9904034

(51) Int. Cl.⁷ ................................................. F02K 1/62
(52) U.S. Cl. .................................. 60/226.2; 239/265.31
(58) Field of Search ............................... 60/226.2, 230; 239/265.31

(56) References Cited

U.S. PATENT DOCUMENTS

| 3,824,784 | A | * | 7/1974 | Kitson et al. | .............. | 60/226.2 |
| 3,829,020 | A | | 8/1974 | Stearns | | |
| 3,981,451 | A | * | 9/1976 | Prior et al. | ................. | 60/226.2 |
| 4,732,535 | A | * | 3/1988 | Tubbs | ........................ | 60/226.2 |
| 5,794,434 | A | * | 8/1998 | Szupkay | ..................... | 60/226.2 |
| 5,806,302 | A | * | 9/1998 | Cariola et al. | ............. | 60/226.2 |
| 6,151,883 | A | * | 11/2000 | Hatrick et al. | ............. | 60/226.2 |
| 6,170,253 | B1 | * | 1/2001 | Newton | ..................... | 60/226.2 |
| 6,170,254 | B1 | * | 1/2001 | Cariola | ....................... | 60/226.2 |

FOREIGN PATENT DOCUMENTS

| GB | 1062839 | 3/1967 |
| GB | 1142660 | 2/1969 |
| GB | 1 338 240 | 11/1973 |
| GB | 1 386 232 | 3/1975 |
| GB | 2182724 A | 5/1987 |
| WO | 83/03281 | 9/1983 |

* cited by examiner

*Primary Examiner*—Michael Koczo
(74) *Attorney, Agent, or Firm*—Pillsbury Winthrop LLP

(57) ABSTRACT

A thrust reverser for a gas turbine engine (10) comprises cascade structures (20,22) mounted in an engine cowl (12). The cascades (20,22) comprise a plurality of air deflecting vanes (24) arranged in fixed space relationship. At least one of the cascades (22) translates between a first inoperative position where the cascade (22) is stowed radially inward of the cowl (12) and a second operative position where the cascade (22) is clear of the cowl (12) to expose the air deflecting vanes (24). When the trust reverser is operative blocker doors (26) pivot across an annular duct (13) defined between the core engine (11) and the cowl (12) to deflect the airflow passing therethrough to the exposed cascades (20, 22) to produce a braking force.

7 Claims, 2 Drawing Sheets

THRUST REVERSER

The present invention relates to a thrust reverser for a gas turbine engine and in particular to a thrust reverser provided on a ducted fan gas turbine engine.

Thrust reversers are used on gas turbine engines to reverse the direction of the gas stream and thus use engine power as a deceleration force. On ducted fan gas turbine engines, reverse thrust action is achieved by reversing the fan airflow. As the majority of thrust is derived from the fan sufficient reverse thrust is achieved by reversing the cold fan stream airflow alone.

Thrust reversers on ducted fan gas turbine engines comprise a plurality of doors which can be translated into a position in which they block the fan air outlet. The fan air is then deflected by the doors through a plurality of deflector vanes located in the engine cowling which are exposed by translation of the cowling. The fan air is directed in a generally outward and partially forward direction by the deflector vanes to provide braking.

The deflector vanes are arranged in segments known as cascades which are positioned around the circumference of the engine cowling. To achieve sufficient braking the engine cowling must translate the length of the cascades to expose all the deflector vanes.

In ducted fan gas turbine engines the size of the cascades are determined by the amount of fan air that bypasses the core engine. For high bypass ducted fan gas turbine engines the size of the cascades can lengthen the engine cowling considerably.

GB2182724B, which is owned by the applicant, provides cascades which enable the length of the engine cowling to be shortened. In GB2182724B the vanes are stowed in a stacked relationship which reduces the overall length of the cowling. in order for the deflector vanes to be stacked when stowed they are not securely mounted and the vanes may fail or be damaged during operation of the thrust reverser.

The present invention seeks to provide a thrust reverser which is compact when stowed to reduce the overall length of the cowling but which is less complex and in which the vanes are securely mounted to overcome the aforementioned problems.

According to the present invention a thrust reverser for a gas turbine engine includes a cowl and at least first and second cascade structures, each cascade structure comprising a plurality of air deflecting vanes in fixed spaced relationship, the first cascade being fixed adjacent a fixed portion of the cowl and the second cascade being mounted to translate between a first inoperative position where the second cascade is stowed radially inward of the first cascade and a second operative position where it is moved clear of the first cascade and the cowl to expose the air deflecting vanes.

An annular portion of the cowl is translatable and the translating cascade is preferably mounted on the translating portion of the cowl so that movement of the cowl moves the cascade. The translating portion of the cowl may be intermediate the upstream and downstream ends of the cowl.

In the preferred embodiment of the present invention the cascade structure is stowed within the fixed portion of the cowl in the inoperative position.

The thrust reverser may include blocker doors mounted for operation in a gas duct, the outer wall of which is defined by said cowl, said blocker doors being moveable between a position wherein they block the duct and divert gases in the gas duct to the cascade and a position wherein they provide part of the flow structure of said duct outer wall.

The present invention will now be described with reference to the accompanying drawings in which.

Figure 1:
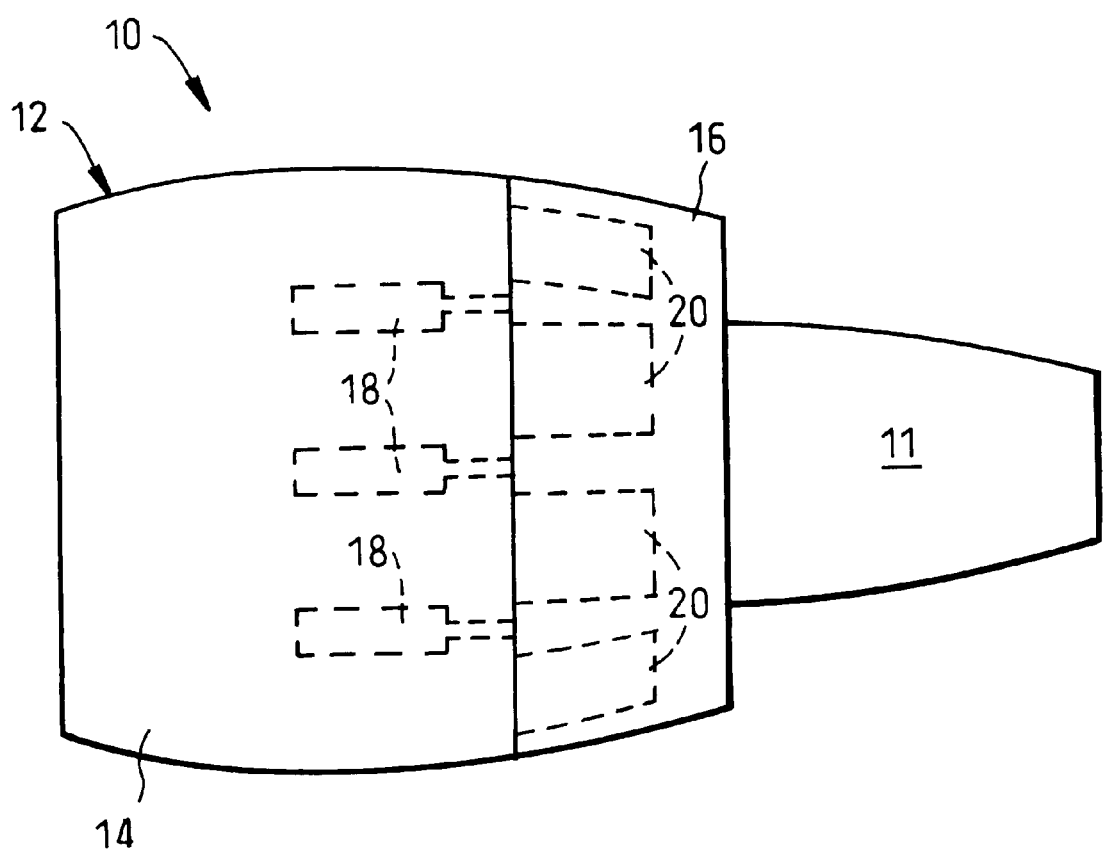
FIG. 1 is a diagrammatic view of a ducted fan gas turbine engine incorporating a thrust reverser in accordance with the present invention.

With reference to FIG. 1, a ducted fan gas turbine engine generally indicated at 10 comprises a core engine 11 surrounded by an annular cowl 12 to define an annular duct 13. The downstream portion 16 of the cowl 12 is translatable relative to the remainder 14 of the cowl 12. Translation of the downstream portion 16 of the cowl 12 is brought about by the operation of rams 18 located in the fixed upstream portion 14 of the cowl 12.

Figure 2:
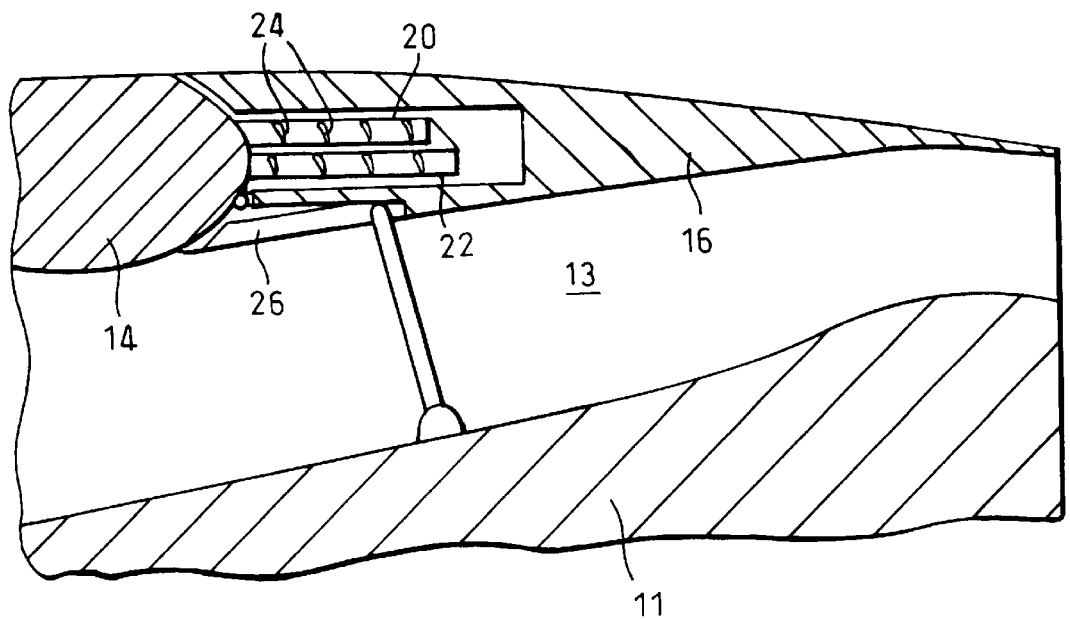
FIG. 2 is a sectioned side view a thrust reverser in accordance with the present invention in the stowed position.

A number of thrust reverser cascades 20, 22 are stowed within the cowl 12, FIG. 2. Each cascade 20, 22 comprises a plurality of deflector vanes 24 in fixed space relationship. The cascade 20 is attached to the fixed portion of the cowl 14. The cascade 22 is mounted on the translatable portion 16 of the cowl 12 so that it is stowed radially inward of the fixed cascade 20.

The translating portion 16 of cowl 12 comprises a portion intermediate the upstream end of cowl 12 and the downstream end of cowl 12.

The translatable cowl portion 16 includes within its inner wall a number of equiangular, spaced blocker doors 26. Each blocker door 26 is pivotable connected at its upstream end to the inner wall of the cowl portion 16.

Figure 3:
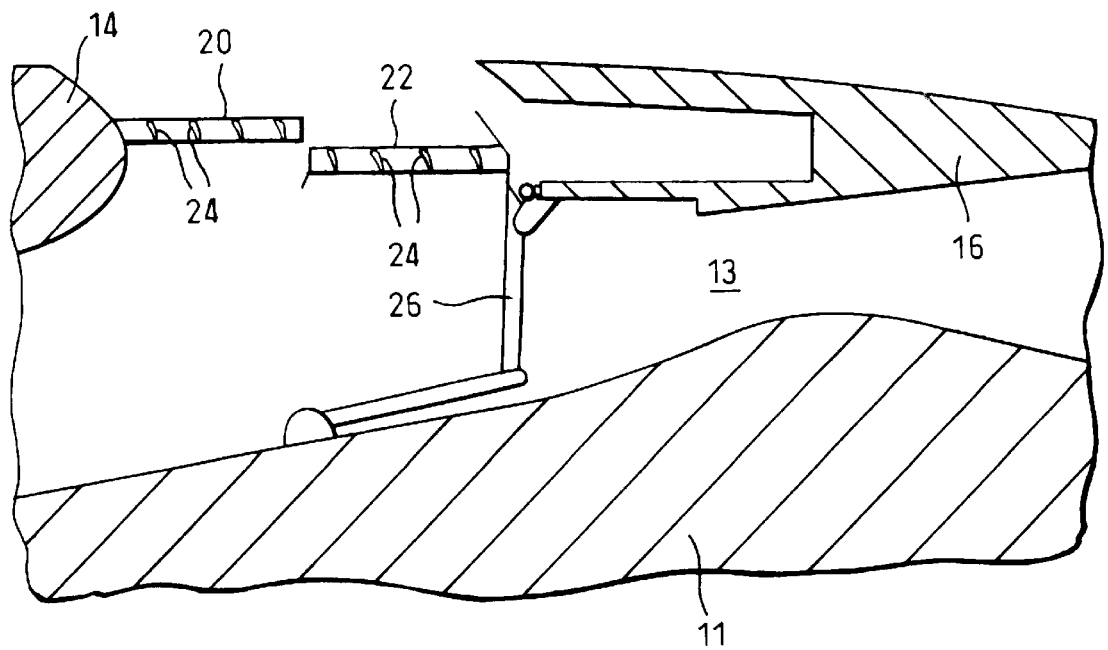
FIG. 3 is a sectioned side view of the thrust reverser in accordance with the present invention in the deployed position.

When the thrust reverser is deployed, FIG. 3, the cowl portion 16 translates rearwards. The blocker doors 26 pivot across the annular duct 13 to a position where they block most or all of the duct 13 at a position downstream of the cascades 20,22. The cascade 22 moves as the cowl portion 16 translates rearwards. The deflector vanes 24 in the cascade 22 are exposed and air deflected by the blocker doors 26 passes through the deflector vanes 24 to produce a braking force.

It will be appreciated by one skilled in the art that the thrust reverser may have any number or different combinations of fixed and translatable cascades 20,22. The mechanism for translating the cascades 22 from the stowed inoperative position to the operative position may be independent or connected to the mechanism for translating the cowl portion 16.

I claim:

1. A thrust reverser for a gas turbine engine including a cowl and at least first and second cascade structures, each cascade structure comprising a plurality of air deflecting vanes in a fixed spaced relationship, the first cascade being fixed adjacent a fixed e portion of the cowl and the second cascade being mounted to translate between a first inoperative position where the second cascade is stowed radially inward of the first cascade and a second operative position where the second cascade is translated downstream of the first cascade to a position where the air deflecting vanes are exposed.

2. A thrust reverser as claimed in claim 1 in which an annular portion of the cowl is translatable relative to a fixed portion thereof.

3. A thrust reverser as claimed in claim 2 in which the second cascade is mounted on the translating portion of the cowl so that movement of the cowl moves the cascade.

4. A thrust reverser as claimed in claim 1, in which the second cascade when inoperative is stowed within the translating cowl portion.

5. A thrust reverser as claimed in claim 2 in which the translating portion of the cowl comprises a portion intermediate the upstream and downstream ends of the cowl.

6. A thrust reverser as claimed in claim 1 including blocker doors mounted for operation in a gas duct, the outer wall of said gas duct being defined by said cowl, said blocker doors being moveable between a position wherein said blocker doors block the duct and divert gases in the gas duct to the cascade and a position wherein they comprise part of the flow structure of said duct outer wall.

7. A thrust reverser as claimed in claim 3 in which the translating portion of the cowl comprises a portion intermediate the upstream and downstream ends of the cowl.

\* \* \* \* \*